(12) United States Patent
Kim

(10) Patent No.: US 11,377,148 B2
(45) Date of Patent: Jul. 5, 2022

(54) VEHICLE STEERING APPARATUS

(71) Applicant: MANDO CORPORATION, Gyeonggi-do (KR)

(72) Inventor: Jong Han Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 420 days.

(21) Appl. No.: 16/568,237

(22) Filed: Sep. 11, 2019

(65) Prior Publication Data

US 2020/0096402 A1 Mar. 26, 2020

(30) Foreign Application Priority Data

Sep. 21, 2018 (KR) .................. 10-2018-0114145

(51) Int. Cl.
| | |
|---|---|
| *B62D 6/10* | (2006.01) |
| *G01L 3/10* | (2006.01) |
| *B62D 1/16* | (2006.01) |
| *B62D 5/04* | (2006.01) |
| *B62D 15/02* | (2006.01) |
| *G01L 5/22* | (2006.01) |

(52) U.S. Cl.
CPC ............. *B62D 6/10* (2013.01); *B62D 1/16* (2013.01); *B62D 5/0481* (2013.01); *B62D 15/022* (2013.01); *G01L 3/109* (2013.01); *B60Y 2400/307* (2013.01); *B62D 5/046* (2013.01); *B62D 5/0409* (2013.01); *G01L 5/221* (2013.01)

(58) Field of Classification Search
None
See application file for complete search history.

(56) References Cited

U.S. PATENT DOCUMENTS

| | | | | |
|---|---|---|---|---|
| 6,260,422 B1* | 7/2001 | Odachi | .................... | G01L 3/105 |
| | | | | 73/862.334 |
| 6,291,914 B1* | 9/2001 | Mukaiyama | ......... | G01D 11/245 |
| | | | | 310/68 B |
| 6,557,425 B2* | 5/2003 | Kamiya | .................. | G01L 3/101 |
| | | | | 73/862.08 |
| 6,707,182 B2* | 3/2004 | Yamanaka | .............. | G01L 3/105 |
| | | | | 310/67 R |

(Continued)

FOREIGN PATENT DOCUMENTS

| | | | | |
|---|---|---|---|---|
| EP | 1 691 475 | | 8/2006 | |
| EP | 1691475 A2 * | | 8/2006 | ............. B62D 5/046 |

(Continued)

OTHER PUBLICATIONS

Notice of Allowance dated Feb. 14, 2020 for Korean Application No. 10-2018-0114145 and its English translation by Google Translate.

(Continued)

*Primary Examiner* — Kevin R Steckbauer
(74) *Attorney, Agent, or Firm* — Ladas & Parry, LLP

(57) ABSTRACT

A vehicle steering apparatus. The durability of a sensor rotor to heat and abrasion is improved. The flatness of the sensor rotor is prevented from being lowered during calking for coupling of the sensor rotor to a steering shaft so that steering torque of a driver can be more accurately detected. A fabrication process is simplified, and fabrication costs are reduced.

12 Claims, 14 Drawing Sheets

(56) References Cited

U.S. PATENT DOCUMENTS

| | | | |
|---|---|---|---|
| 8,203,245 B2* | 6/2012 | Ishikawa | H02K 1/278 310/156.19 |
| 8,482,177 B2* | 7/2013 | Kim | H02K 15/12 310/156.08 |
| 9,046,429 B2* | 6/2015 | Hibi | G01L 3/101 |
| 9,116,059 B2* | 8/2015 | Maehara | G01L 3/101 |
| 9,391,488 B1* | 7/2016 | Kodani | H02K 11/215 |
| 9,638,595 B2* | 5/2017 | Shigeta | G01L 5/221 |
| 10,177,637 B2* | 1/2019 | Takizawa | H02K 1/2746 |
| 10,683,032 B2* | 6/2020 | Toyama | B62D 5/0463 |
| 10,797,568 B2* | 10/2020 | Ohzu | H02K 9/19 |
| 10,814,909 B2* | 10/2020 | Yang | G01D 5/12 |
| 10,855,121 B2* | 12/2020 | Hirotani | H02K 15/022 |
| 11,162,857 B2* | 11/2021 | Scheer | G01L 3/101 |
| 2002/0040608 A1* | 4/2002 | Kamiya | G01L 3/101 73/862.334 |
| 2003/0136604 A1* | 7/2003 | Yamanaka | G01L 5/221 180/444 |
| 2004/0250631 A1* | 12/2004 | Pattok | G01L 3/101 73/862.331 |
| 2006/0138894 A1* | 6/2006 | Harada | H02K 15/02 310/156.19 |
| 2009/0261677 A1* | 10/2009 | Ishikawa | H02K 1/278 29/598 |
| 2010/0244606 A1* | 9/2010 | Kim | H02K 15/12 29/598 |
| 2013/0026869 A1* | 1/2013 | Kim | H02K 5/1732 310/66 |
| 2013/0327158 A1* | 12/2013 | Hibi | G01L 3/04 73/862.191 |
| 2016/0181888 A1* | 6/2016 | Kodani | G02B 26/121 310/68 B |
| 2016/0238476 A1* | 8/2016 | Shigeta | B62D 5/0481 |
| 2016/0312667 A1* | 10/2016 | Weber | F01L 1/3442 |
| 2016/0315528 A1* | 10/2016 | Takizawa | H02K 29/03 |
| 2017/0259325 A1* | 9/2017 | Becker | B21J 15/36 |
| 2018/0029638 A1* | 2/2018 | Toyama | B62D 5/0463 |
| 2018/0216719 A1* | 8/2018 | Kim | F16H 57/0018 |
| 2019/0097474 A1* | 3/2019 | Hirotani | H02K 1/18 |
| 2019/0101164 A1* | 4/2019 | Yeom | F16D 3/12 |
| 2019/0296616 A1* | 9/2019 | Ohzu | G01J 3/102 |
| 2019/0322315 A1* | 10/2019 | Birsching | B62D 5/062 |
| 2019/0344826 A1* | 11/2019 | Yang | B62D 6/10 |
| 2019/0389507 A1* | 12/2019 | Murakami | B62D 6/00 |
| 2020/0062291 A1* | 2/2020 | Yasuda | B62D 5/0412 |
| 2020/0062305 A1* | 2/2020 | Kwon | B62D 7/226 |
| 2020/0096402 A1* | 3/2020 | Kim | B62D 6/10 |
| 2020/0290113 A1* | 9/2020 | Suehiro | B21J 5/02 |
| 2020/0348196 A1* | 11/2020 | Son | B62D 15/0215 |
| 2020/0377145 A1* | 12/2020 | Suehiro | B21J 5/12 |
| 2021/0080288 A1* | 3/2021 | Lee | G01L 5/221 |
| 2021/0086829 A1* | 3/2021 | Knoll | G01L 3/104 |
| 2021/0164852 A1* | 6/2021 | Scheer | G01D 11/245 |
| 2021/0190611 A1* | 6/2021 | Liang | B62D 6/10 |
| 2021/0199520 A1* | 7/2021 | Knoll | B62D 3/12 |
| 2021/0234421 A1* | 7/2021 | Naitou | H02K 7/06 |

FOREIGN PATENT DOCUMENTS

| | | | | |
|---|---|---|---|---|
| EP | 1691475 A3 | * | 5/2007 | B62D 5/046 |
| EP | 1691475 B1 | * | 6/2012 | B62D 5/046 |
| JP | 05056582 A | * | 3/1993 | B62D 5/04 |
| JP | 2002-116098 | | 4/2002 | |
| JP | 2002112481 A | * | 4/2002 | H02K 1/30 |
| JP | 2003-185510 | | 7/2003 | |
| JP | 2003185510 A | * | 7/2003 | B62D 5/04 |
| JP | 2006329436 A | * | 12/2006 | F16L 19/08 |
| JP | 2021087268 A | * | 6/2021 | H02K 15/02 |
| KR | 10-2005-0055138 | | 6/2005 | |
| KR | 20050055138 A | * | 6/2005 | F16H 3/12 |
| KR | 10-2015-0029943 | | 3/2015 | |
| KR | 20150029943 A | * | 3/2015 | B62D 5/04 |
| KR | 10-2015-0077562 | | 7/2015 | |
| KR | 101537585 B1 | * | 7/2015 | B62D 5/04 |
| KR | 20150077562 A | * | 7/2015 | B62D 5/04 |
| KR | 20200034399 A | * | 3/2020 | B62D 15/02 |

OTHER PUBLICATIONS

Office Action dated Oct. 2, 2019 for Korean Patent Application No. 10-2018-0114145 and its English machine translation by Google Translate.

* cited by examiner

VEHICLE STEERING APPARATUS

CROSS REFERENCE TO RELATED APPLICATION

This application claims priority from Korean Patent Application No. 10-2018-0114145, filed on Sep. 21, 2018, which is hereby incorporated by reference for all purposes as if fully set forth herein.

BACKGROUND

Field

Embodiments relate to a vehicle steering apparatus and, more particularly, to a vehicle steering apparatus having a structure by which the durability of a sensor rotor to heat and abrasion can be improved, the flatness of the sensor rotor can be prevented from being lowered during calking for coupling of the sensor rotor to a steering shaft so that steering torque of a driver can be more accurately detected, a fabrication process can be simplified, and fabrication costs can be reduced.

Description of Related Art

A steering shaft includes an input shaft connected to a steering wheel, an output shaft connected to a pinion shaft engaged with a rack bar, and a torsion bar connecting the input shaft and the output shaft. A torque sensor and a rotor are coupled to each of the input shaft and the output shaft to detect torque, generated in response to a driver manipulating the steering wheel, and to transmit a signal indicating the torque to an electric control unit (ECU). In this manner, the manipulation feel for the driver, the reliability of the vehicle, and the like can be improved.

That is, when a driver rotates the input shaft by manipulating the steering wheel, the torsion bar is tilted at a predetermined angle, so that the input shaft and the output shaft have a phase difference therebetween, then steering torque is calculated depending on the strength of the torsion bar.

The phase difference between the input shaft and the output shaft is obtained by the torque sensor detecting a phase difference with respect to a rotor. The rotor includes blades facing the torque sensor and a sleeve coupled to the blades and the output shaft.

However, in a steering apparatus of the related art, the sleeve formed of plastic and the blades formed of steel are connected by molding, which may result in a complicated fabrication process. In particular, the sleeve formed of plastic may be deformed or abraded in a high-temperature environment, and the flatness of the rotor may be lowered. Accordingly, an accurate phase difference may not be obtained, which is problematic.

Alternatively, in the steering apparatus of the related art, the sleeve and the blades are separately formed of steel and are then coupled by welding. However, even in this case, a fabrication process may be complicated. In particular, the flatness of the sleeve may be lowered during calking, so that an accurate phase difference may not be obtained, which is problematic.

BRIEF SUMMARY

Various aspects provide a vehicle steering apparatus having a structure by which the durability of a sensor rotor to heat and abrasion can be improved, the flatness of the sensor rotor can be prevented from being lowered during calking for coupling of the sensor rotor to a steering shaft so that steering torque of a driver can be more accurately detected, a fabrication process can be simplified, and fabrication costs can be reduced.

The object of the present disclosure is not limited to the aforementioned description, and other objects not explicitly disclosed herein will be clearly understood by those having ordinary knowledge in the technical field, to which the present disclosure pertains, from the description provided hereinafter.

According to an aspect, a vehicle steering apparatus may include: a first shaft to which one which one end of a torsion bar and a torque sensor are coupled; a second shaft to which the other end of the torsion bar is coupled, the second shaft having a recess in an outer circumferential surface of one end portion thereof; and a sensor rotor comprising an annular body coupled to the outer circumferential surface of the one end portion of the second shaft, with a stepped portion being provided in an inner circumferential surface thereof to be open in one axial direction, and blades protruding from outer circumferential portions of the body to face the torque sensor.

According to exemplary embodiments, the durability of the sensor rotor to heat and abrasion can be improved, the flatness of the sensor rotor can be prevented from being lowered during calking for coupling of the sensor rotor to the steering shaft so that steering torque of a driver can be more accurately detected, a fabrication process can be simplified, and fabrication costs can be reduced.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
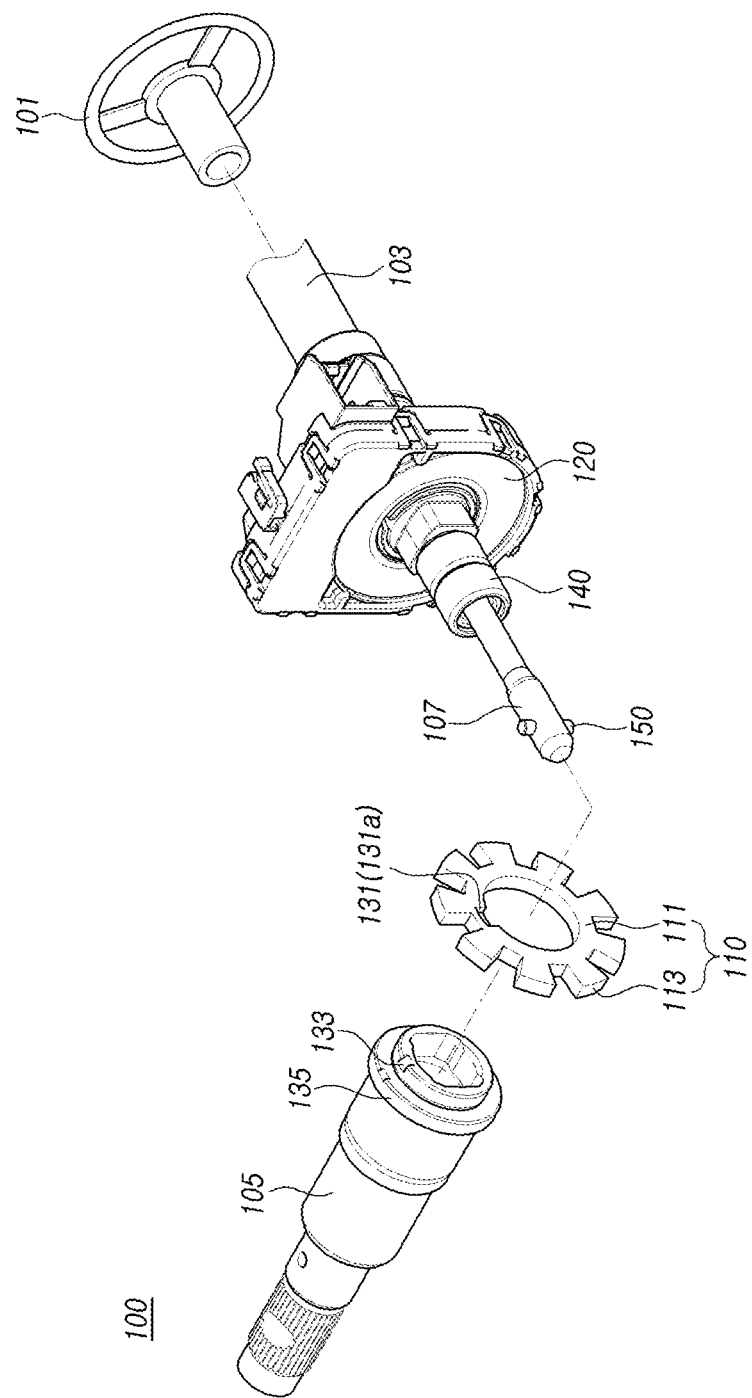
FIG. 1 is an exploded perspective view illustrating a vehicle steering apparatus according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
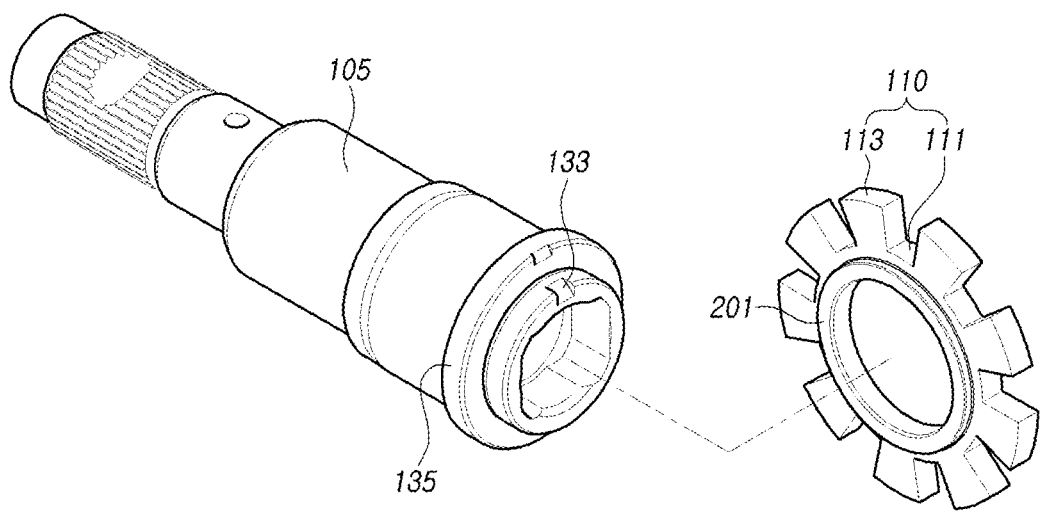
FIGS. 2 and 3 are perspective views illustrating portions of the vehicle steering apparatus illustrated in FIG. 1.
Figure 3:
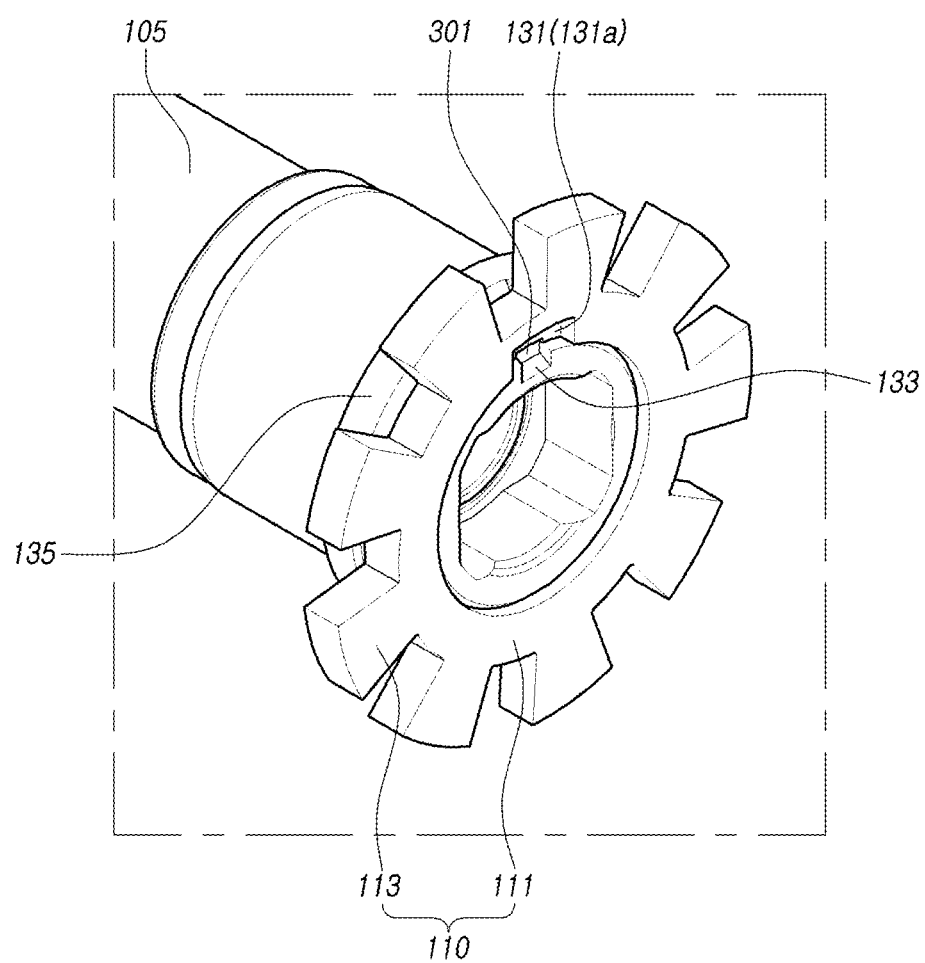
Figure 4:
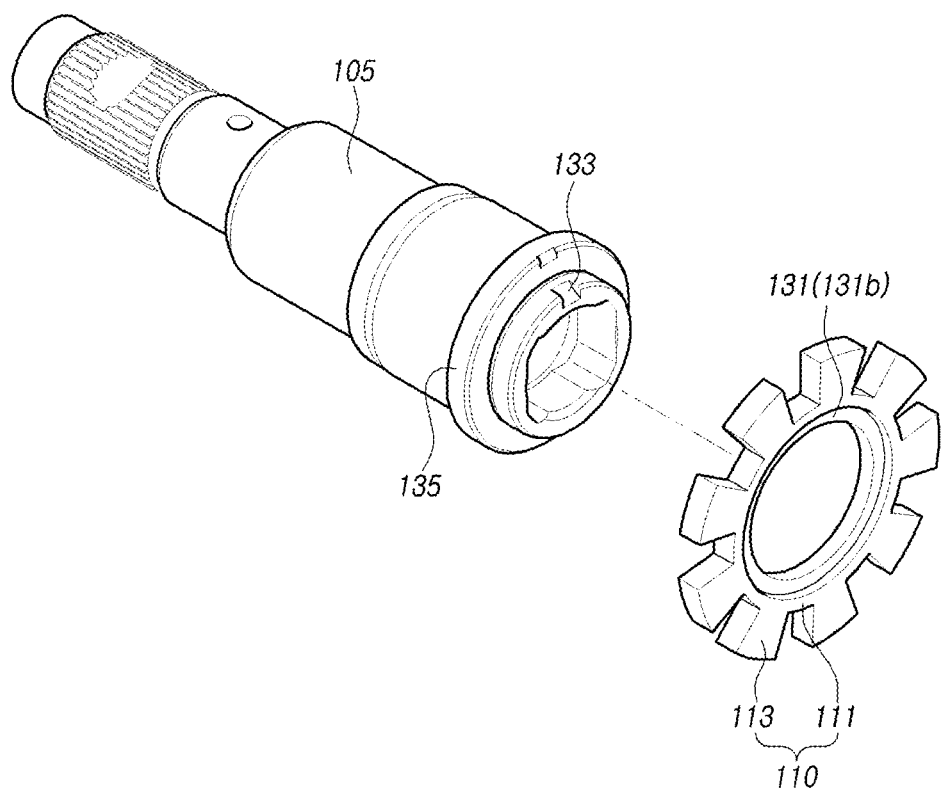
FIGS. 4 and 5 are perspective views illustrating portions of the vehicle steering apparatus according to embodiments.
Figure 5:
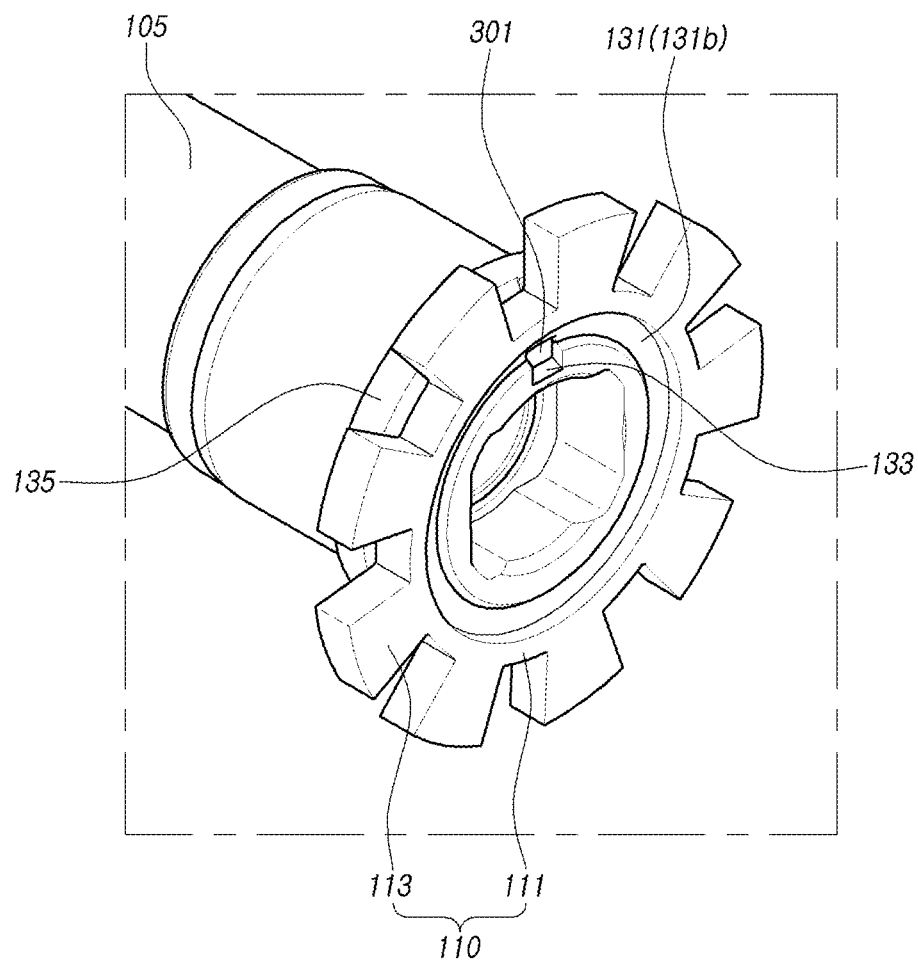
Figure 10:
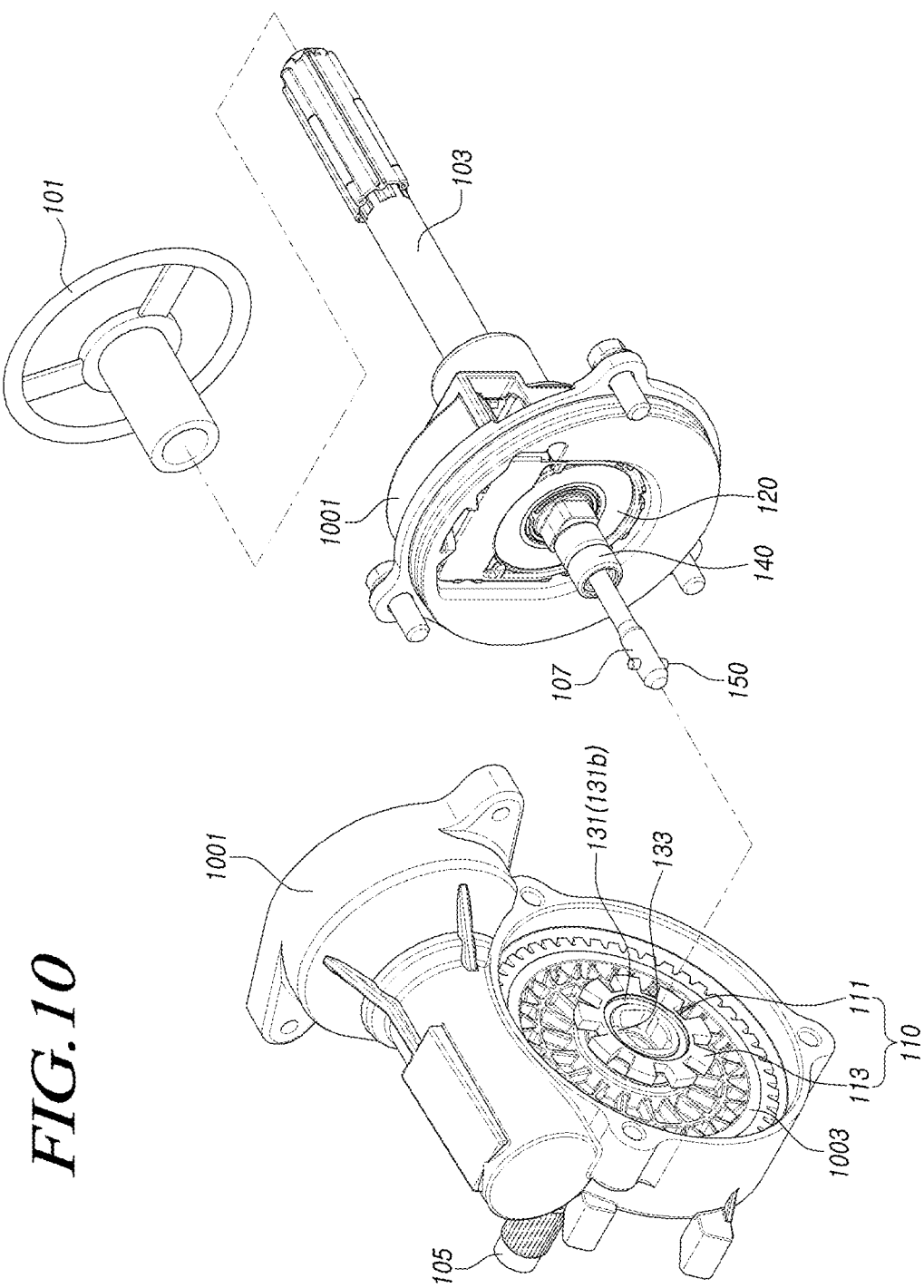
FIG. 10 is an exploded perspective view illustrating the vehicle steering apparatus according to embodiments.
Figure 11:
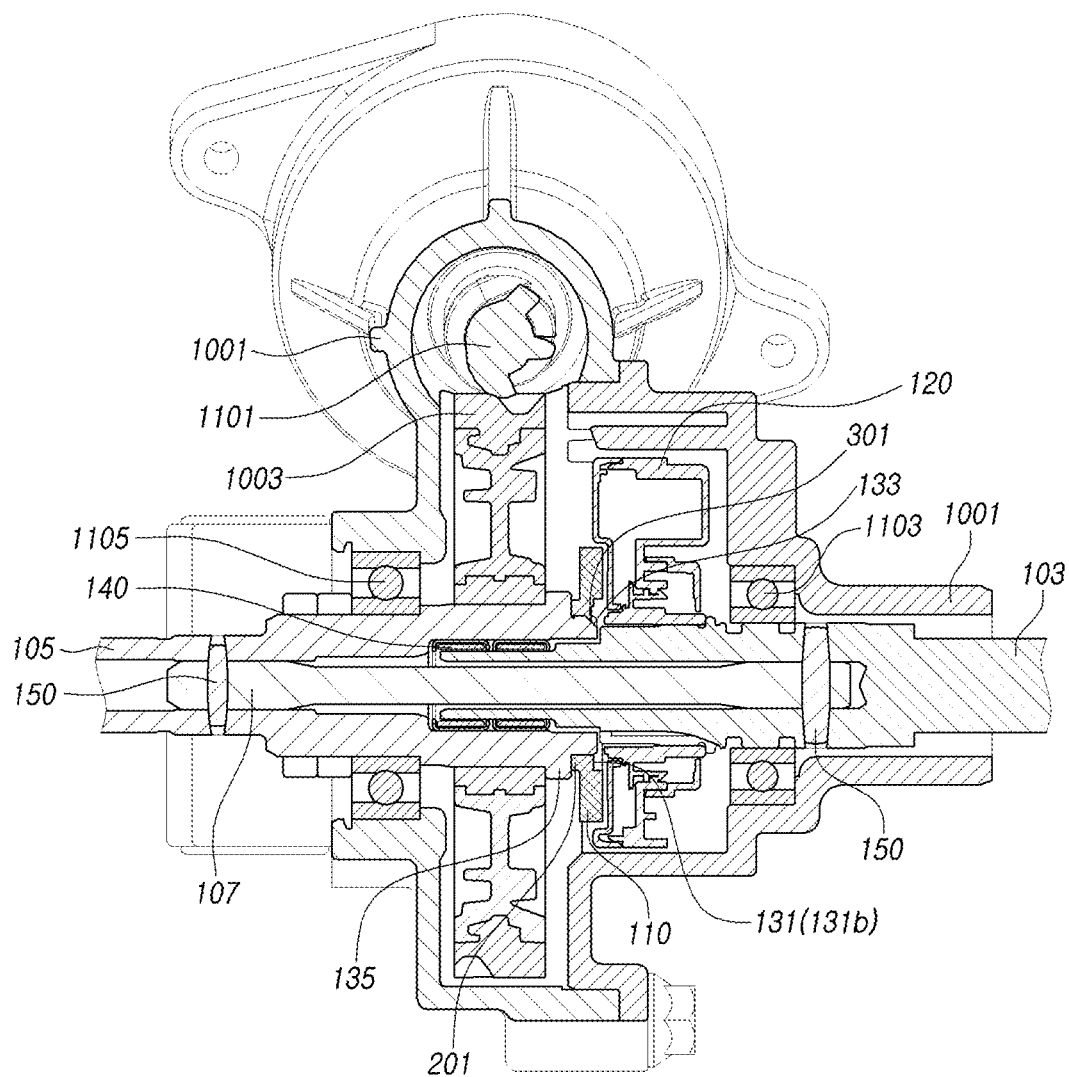
FIG. 11 is a cross-sectional view illustrating the vehicle steering apparatus illustrated in FIG. 10.
Figure 12:
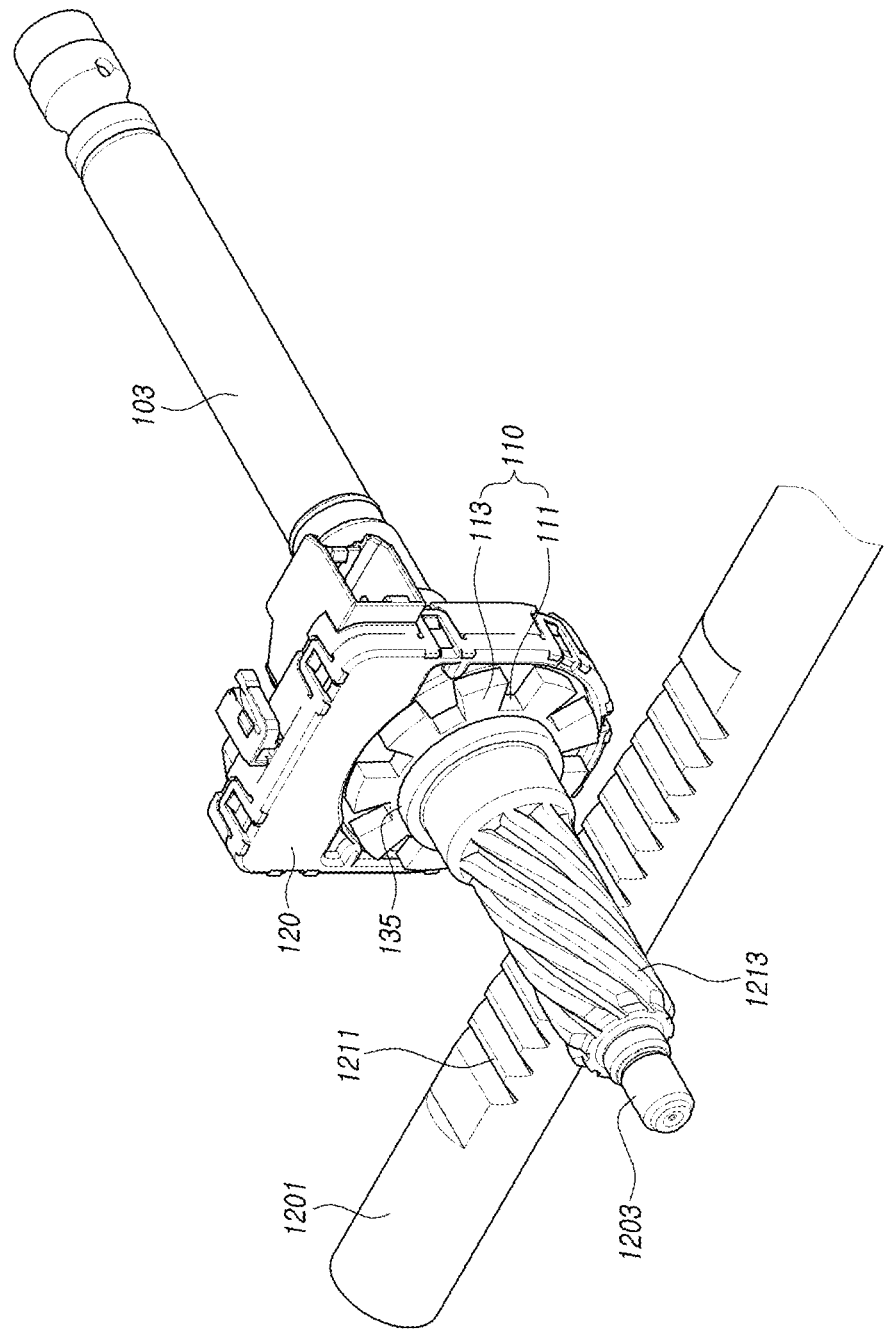
FIGS. 12 to 13 are perspective views illustrating the vehicle steering apparatus according to embodiments.
Figure 13:
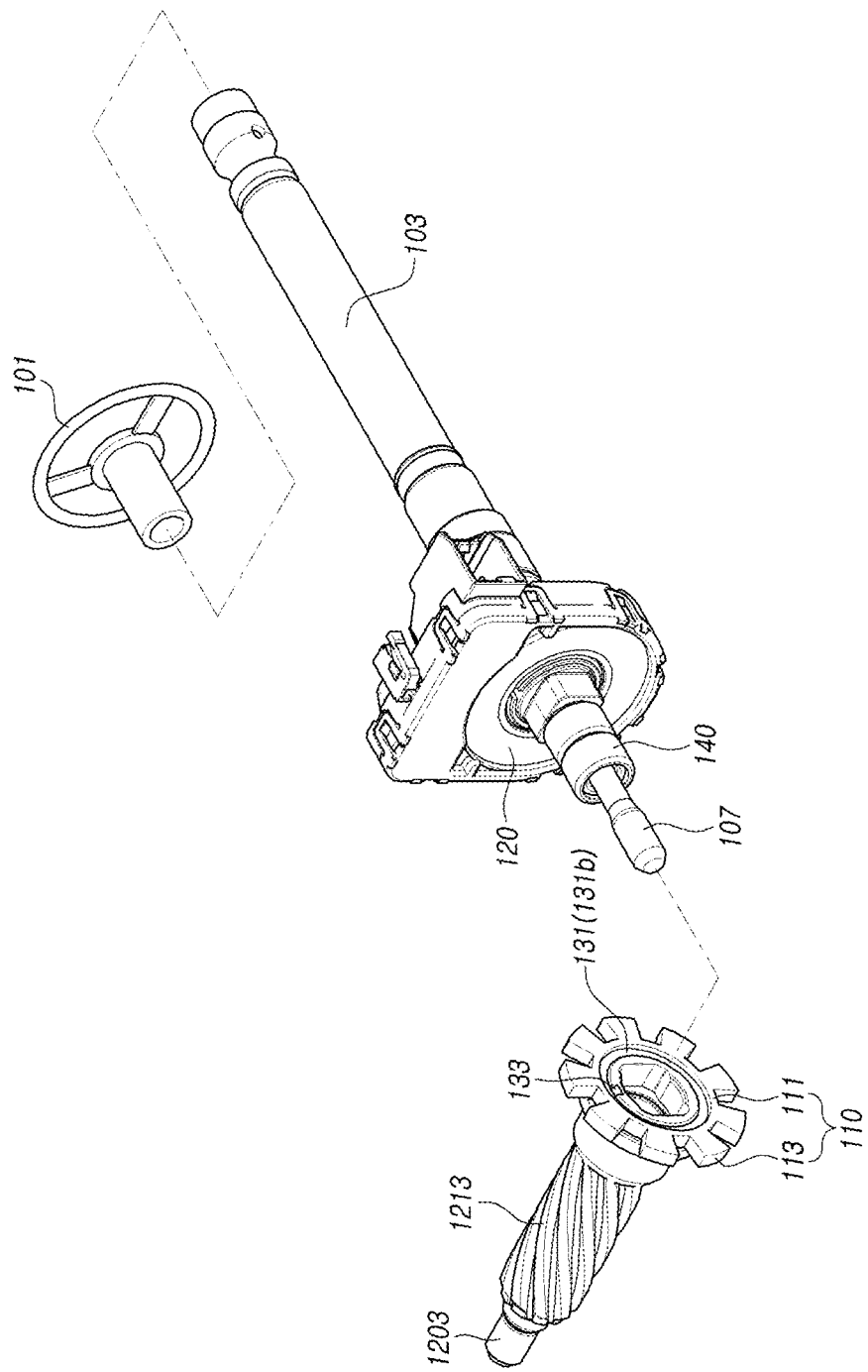
Figure 14:
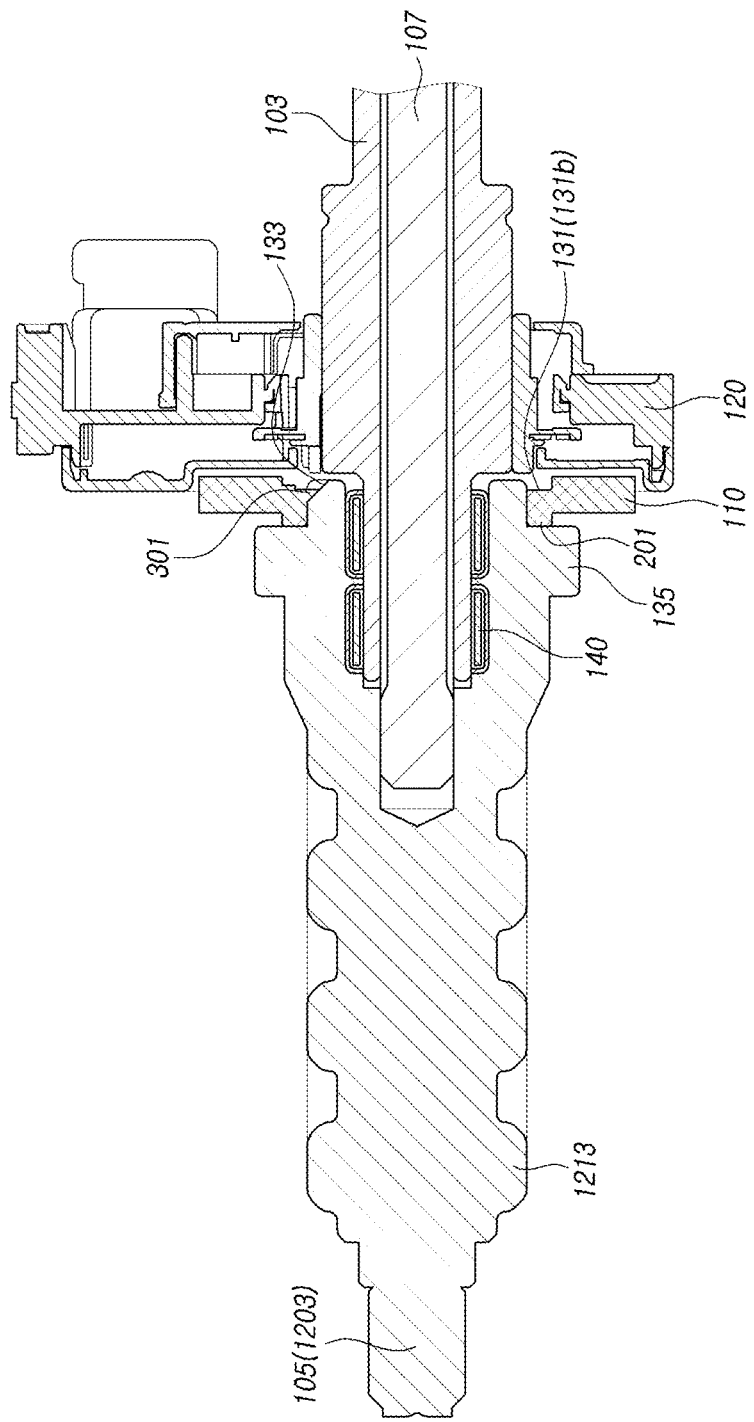
FIG. 14 is a cross-sectional view illustrating an assembly of portions of the vehicle steering apparatus illustrated in FIG. 12.

FIG. 1 is an exploded perspective view illustrating a vehicle steering apparatus according to embodiments, FIGS. 2 and 3 are perspective views illustrating portions of the vehicle steering apparatus illustrated in FIG. 1, FIGS. 4 and 5 are perspective views illustrating portions of the vehicle steering apparatus according to embodiments, FIGS. 6 to 9 are cross-sectional views illustrating the vehicle steering apparatus according to embodiments, FIG. 10 is an exploded perspective view illustrating the vehicle steering apparatus according to embodiments, FIG. 11 is a cross-sectional view illustrating the vehicle steering apparatus illustrated in FIG. 10, FIGS. 12 to 13 are perspective views illustrating the vehicle steering apparatus according to embodiments, and FIG. 14 is a cross-sectional view illustrating an assembly of portions of the vehicle steering apparatus illustrated in FIG. 12.

Referring to FIGS. 1 to 14, a vehicle steering apparatus 100 according to embodiments includes: a first shaft 103 to which one end of a torsion bar 107 and a torque sensor 120 are coupled; a second shaft 105 to which the other end of the torsion bar 107 is coupled, the second shaft 105 having a recess 133 in the outer circumferential surface of one end portion thereof; and a sensor rotor 110 including an annular body 111 coupled to the outer circumferential surface of the one end portion of the second shaft 105, with a stepped portion being provided in the inner circumferential surface thereof to be open in one axial direction, and blades 113 protruding from outer circumferential portions of the body 111 to face the torque sensor 120.

One of the first shaft 103 and the second shaft 105 is connected to a steering wheel 101 to be rotated by a driver. Torque generated by the driver manipulating the steering wheel 101 is measured by the sensor rotor 110 and the torque sensor 120.

Hereinafter, for the sake of brevity, the steering wheel 101 will be described as being connected to the first shaft 103 as illustrated in the drawings. However, the present disclosure is not limited thereto.

Each of the first shaft 103 and the second shaft 105 has a hollow structure, and the torsion bar 107 is fitted into and coupled to the first shaft 103 and the second shaft 105.

Couplers 150 are coupled to, while radially extending through, one and the other ends of the torsion bar 107 fitted into the first shaft 103 and the second shaft 105, such that the one and the other ends of the torsion bar 107 are fixed to the first shaft 103 and the second shaft 105, respectively, to rotate together with the first shaft 103 and the second shaft 105.

The first shaft 103 may be fitted into the second shaft 105, such that the first shaft 103 and the second shaft 105 are coupled to each other via a bearing 140. That is, the bearing 140 is provided between the outer circumferential surface of the first shaft 103 and the inner circumferential surface of the second shaft 105.

The bearing 140 may be implemented as a needle bearing having a high level of strength against radial load.

When the first shaft 103 and the second shaft 105, coupled via the bearing 140, are rotated, the torque sensor 120 coupled to the first shaft 103 may detect a phase difference between the first shaft 103 and the second shaft 105, on the basis of a phase difference with respect to the sensor rotor 110 coupled to the second shaft 105, so that the steering torque of the driver may be calculated on the basis of the relationship between the detected phase difference and the strength of the torsion bar 107.

That is, when torque is transferred to the second shaft 105 in response to the first shaft 103 being manipulated by the driver, the torsion bar 107 is tilted, thereby causing the phase difference between the first shaft 103 coupled to one end of torsion bar 107 and the second shaft 105 coupled to the other end of the torsion bar 107, so that the torque sensor 120 detects the phase difference between the first shaft 103 and the second shaft 105.

The sensor rotor 110 includes the annular body 111 coupled to the outer circumferential surface of the second shaft 105 and the blades 113 protruding from the outer circumferential portions of the body 111. The blades 113 are coupled to the second shaft 105 to face the torque sensor 120.

As illustrated in the drawings, each of the blades 113 may be configured such that the radial width thereof increases as extending radially outward. The side surfaces of the blades 113 in one axial direction, facing the torque sensor 120, are provided to define a single plane. The torque sensor 120 detects a change in position of the blades 113 to detect the phase difference between the first shaft 103 and the second shaft 105 generated by tilting of the torsion bar 107.

The torque sensor 120 transmits an electrical signal to an electronic control device (ECU, not shown) provided in the vehicle, on the basis of the detected phase difference, and the electronic control device generates a control signal to control a motor or the like disposed in the vehicle, on the basis of the received electrical signal, so that the manipulation feel for the driver, the reliability of the vehicle, and the like can be improved.

The sensor rotor 110 is formed of a metal, such as steel, to have high durability against heat and abrasion. This may prevent the sensor rotor 110 from being deformed by heat or friction occurring during the rotation of the first shaft 103 and the second shaft 105, so that the flatness of one axial side surface thereof facing the torque sensor 120 may be maintained. The torque sensor 120 may more accurately detect the phase difference between the first shaft 103 and the second shaft 105.

In addition, since the body 111 and the blades 113 are fabricated integrally, an assembly process is removed, thereby facilitating a fabricating process and reducing fabrication costs.

The sensor rotor 110 may be press-fitted into and coupled to the second shaft 105.

Here, the second shaft 105 may include a flange-shaped support 135 protruding from the outer circumferential surface of the second shaft 105 and supported on the other side surface of the body 111 in order to determine the coupling position of the sensor rotor 110 by limiting the axial distance by which the sensor rotor 110 is press-fitted.

That is, as illustrated in the drawings, the support 135 radially protrudes from the outer circumferential surface of the second shaft 105. When the sensor rotor 110 is axially press-fitted, the coupling position of the sensor rotor 110 by the other side surface of the body 111 being supported on the support 135.

In addition, referring to FIG. 2, the body 111 may have a protrusion 201 protruding from the other axial side surface thereof to be supported on the outer circumferential surface of the second shaft 105.

A stepped portion 131 (131*a*, 131*b*) is provided in the inner circumferential surface of the body 111, an area of the sensor rotor 110 supported on the outer circumferential surface of the second shaft 105 is reduced, and the axial thickness of the body 111 is reduced. The sensor rotor 110 may be deformed by pressure applied thereto during the press-fitting of the second shaft 105, the flatness of the blades 113 may be lowered, and the accuracy of the torque sensor 120 may be lowered. To prevent these problems, the protrusion 201 is provided.

That is, the protrusion 201 protruding from the other side surface of the body 111 may increase the area of the sensor rotor 110 supported on the outer circumferential surface of the second shaft 105 during the press-fitting of the sensor rotor 110 around the second shaft 105 and may increase the axial thickness of the portion of the body 111 supported on the second shaft 105, thereby improving the reliability of fitting.

Since the protrusion 201 axially protrudes from the other side surface of the body 111, when the sensor rotor 110 is press-fitted into the outer circumferential surface of the second shaft 105, the distal end of the protrusion 201 is supported on the support 135.

The protrusion 201 may be an annular protrusion extending in the circumferential direction. In other words, the inner diameter of the protrusion 201 is the same as the inner diameter of the body 111, such that the sensor rotor 110 may be evenly supported on the outer circumferential surface of the second shaft 105.

In addition, the stepped portion 131*b* may be an annular stepped portion provided by increasing the inner diameter of the body 111 in one axial side surface of the body 111. The body 111 is configured such that one side surface is depressed while the other side surface protrudes. In this manner, both the protrusion 201 and the stepped portion 131*b* can be simultaneously fabricated by a single process, thereby simplifying the fabricate process while reducing fabrication costs.

In addition, the recess 133 may be provided in the second shaft 105 and a protrusion 301 may protrude from the inner circumferential surface of the body 111 to be fitted into the recess 133 in order to fix the sensor rotor 110, press-fitted into the outer circumferential surface of the second shaft 105, so as not to move in the circumferential direction.

Specifically, the torque sensor 120 must be fixed to the first shaft 103 and the sensor rotor 110 must be fixed to the second shaft 105, so that the torque sensor 120 may detect the phase difference between the first shaft 103 and the second shaft 105, on the basis of the phase difference with respect to the sensor rotor 110. If the sensor rotor 110 skids along the outer circumferential surface of the second shaft 105 instead of being fixed in the circumferential direction, the torque sensor 120 may not accurately detect the phase difference between the first shaft 103 and the second shaft 105.

Accordingly, the recess 133 and the protrusion 301 are provided to fix the sensor rotor 110 on the outer circumferential surface of the second shaft 105 in the circumferential direction.

As will be described later, the protrusion 301 may be provided by calking the body 111 after press-fitting the sensor rotor 110 into the second shaft 105. When the body 111 is calked and plastically deformed, the flatness of the blades 113 may be lowered due to a minute change in position, such as distortion of the blades 113, thereby lowering the accuracy of the torque sensor 120. To prevent this problem, the protrusion 301 may be provided by calking the stepped portion 131.

That is, since the stepped portion 131 is stepped in the inner circumferential surface of the body 111 while being open in one axial direction, one axial side surface of the stepped portion 131 is calked, thereby forming the protrusion 301 to be fitted into the recess 133.

Since calking is performed on one axial side surface of the stepped portion 131 stepped with respect to the plane defined by the blades 113, the flatness of the blades 113 is not influenced by the calking, and thus, the accuracy of the torque sensor 120 is not lowered.

As illustrated in FIG. 3, the stepped portion 131*a* may be provided in a position corresponding to the recess 133.

The recess 133 is provided by depressing one portion of the outer circumferential surface of the second shaft 105. The recess 133 is provided by the calking, in a position in which the stepped portion 131*a* corresponds to the recess 133, thereby forming the protrusion 301.

Alternatively, as illustrated in FIG. 4, the stepped portion 131*b* may be provided by increasing the inner diameter of the inner circumferential surface.

That is, the stepped portion 131*b* may be provided by increasing the inner diameter of the inner circumferential surface of one axial side of the body 111 so as to be spaced apart from the outer circumferential surface of the second shaft 105. The stepped portion 131*b* may be an annular portion extending in the circumferential direction, instead of being provided in the position corresponding to the recess 133.

As illustrated in FIG. 5, since the annular stepped portion 131*b* is provided, the sensor rotor 110 may be fitted into the second shaft 105, irrespective of the position of the recess 133. The protrusion 301 is provided by calking a portion of the stepped portion 131b to be fitted into the recess 133, such that the sensor rotor 110 is fixed on the outer circumferential surface of the second shaft 105 in the circumferential direction.

Here, in a situation in which the stepped portion 131b is provided on one axial side surface of the body 111 by increasing the inner diameter of the inner circumferential surface of the body 111 and the annular protrusion 201 is provided on the other side surface, as described above, the stepped portion 131b and the protrusion 201 may be provided integrally by stamping press processing or the like. Accordingly, it is possible to simplify the fabrication process and reduce fabrication costs.

The stamping press processing is a process of deforming a piece of metal to an intended shape by pressing the piece of metal using a die. In other words, when the stepped portion 131b is provided by pressing the inner circumferential portion of the body 111, the protrusion 201 protrudes in the other side. In this manner, the stepped portion 131b and the protrusion 201 may be simultaneously formed in a simple manner, thereby simplifying the fabrication process and reducing fabrication costs.

Figure 6:
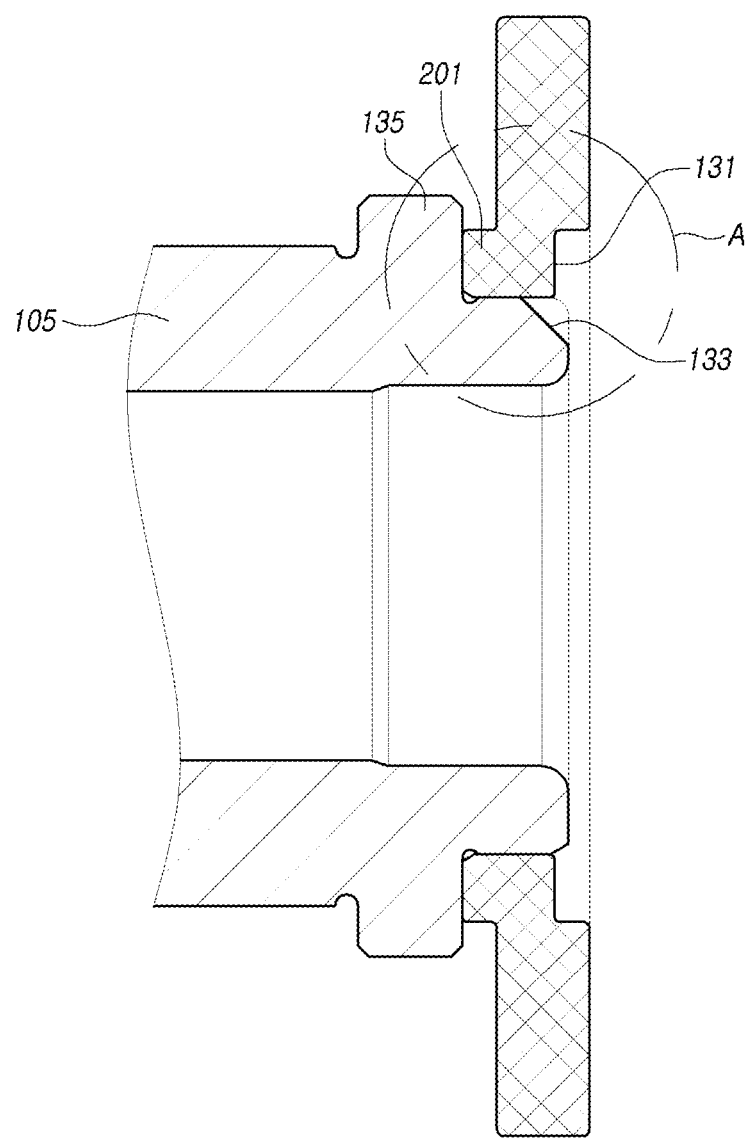
FIGS. 6 to 9 are cross-sectional views illustrating the vehicle steering apparatus according to embodiments.
Figure 7:
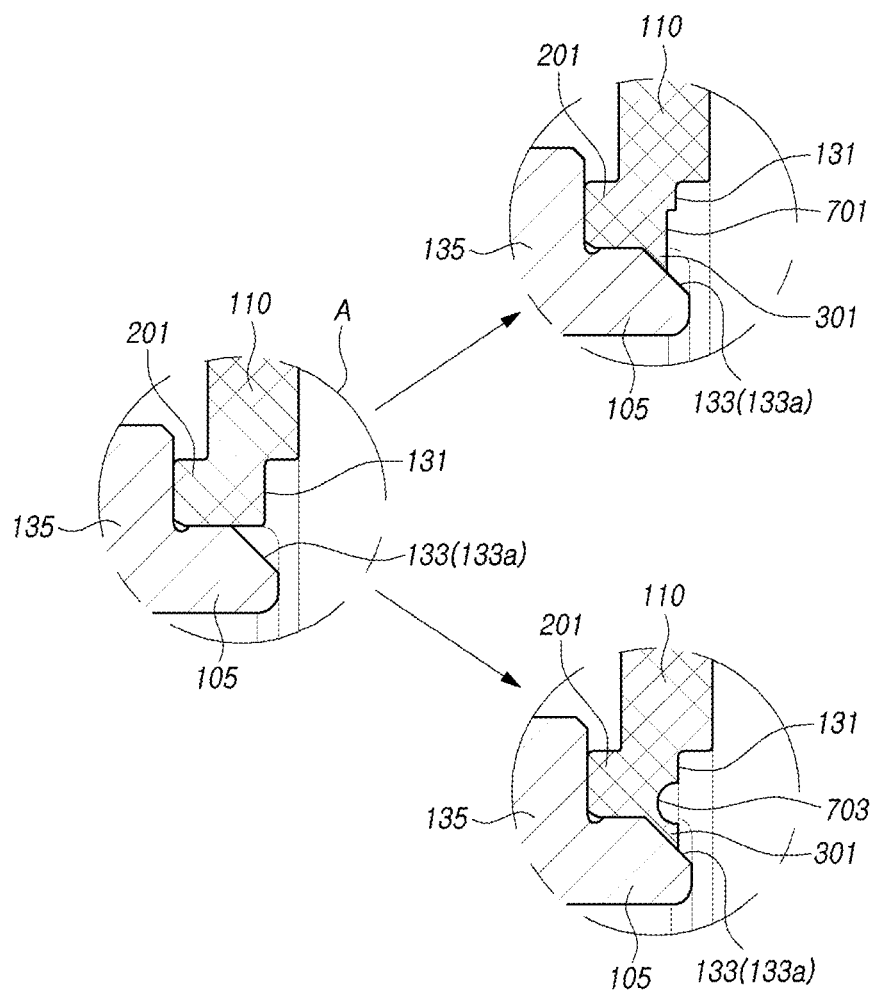
Figure 8:
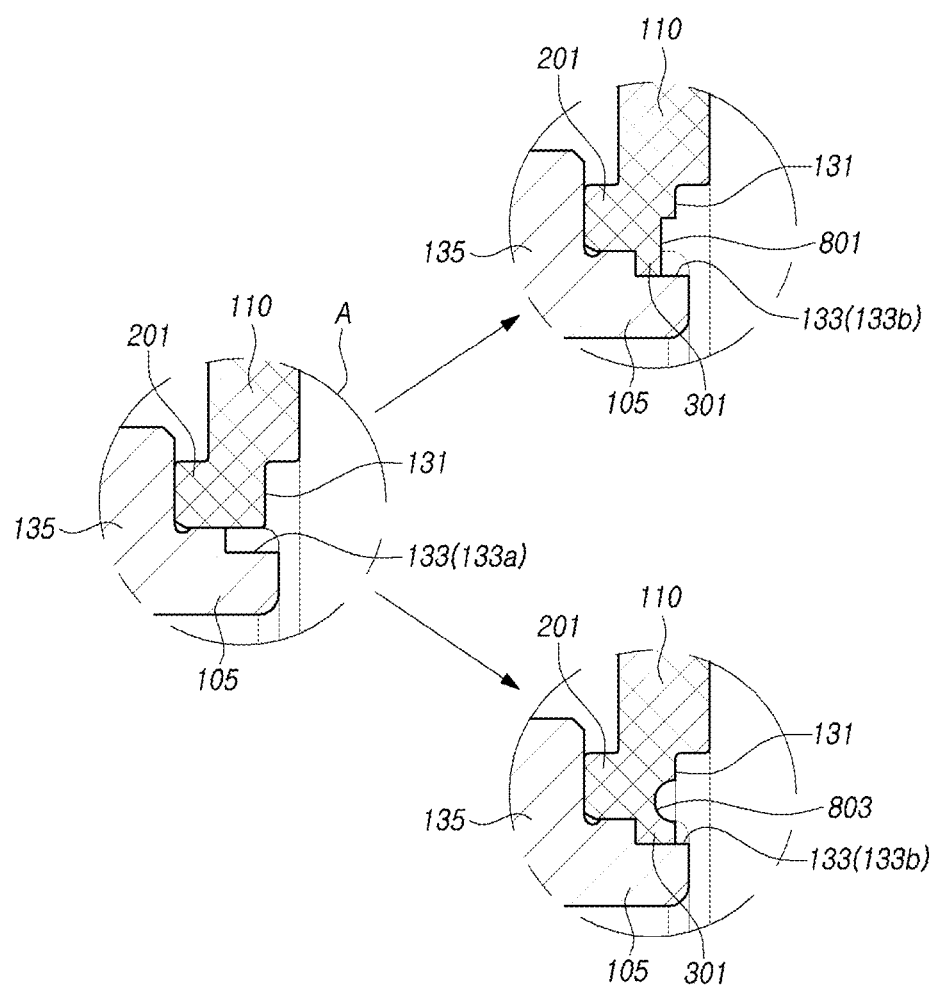
Figure 9:
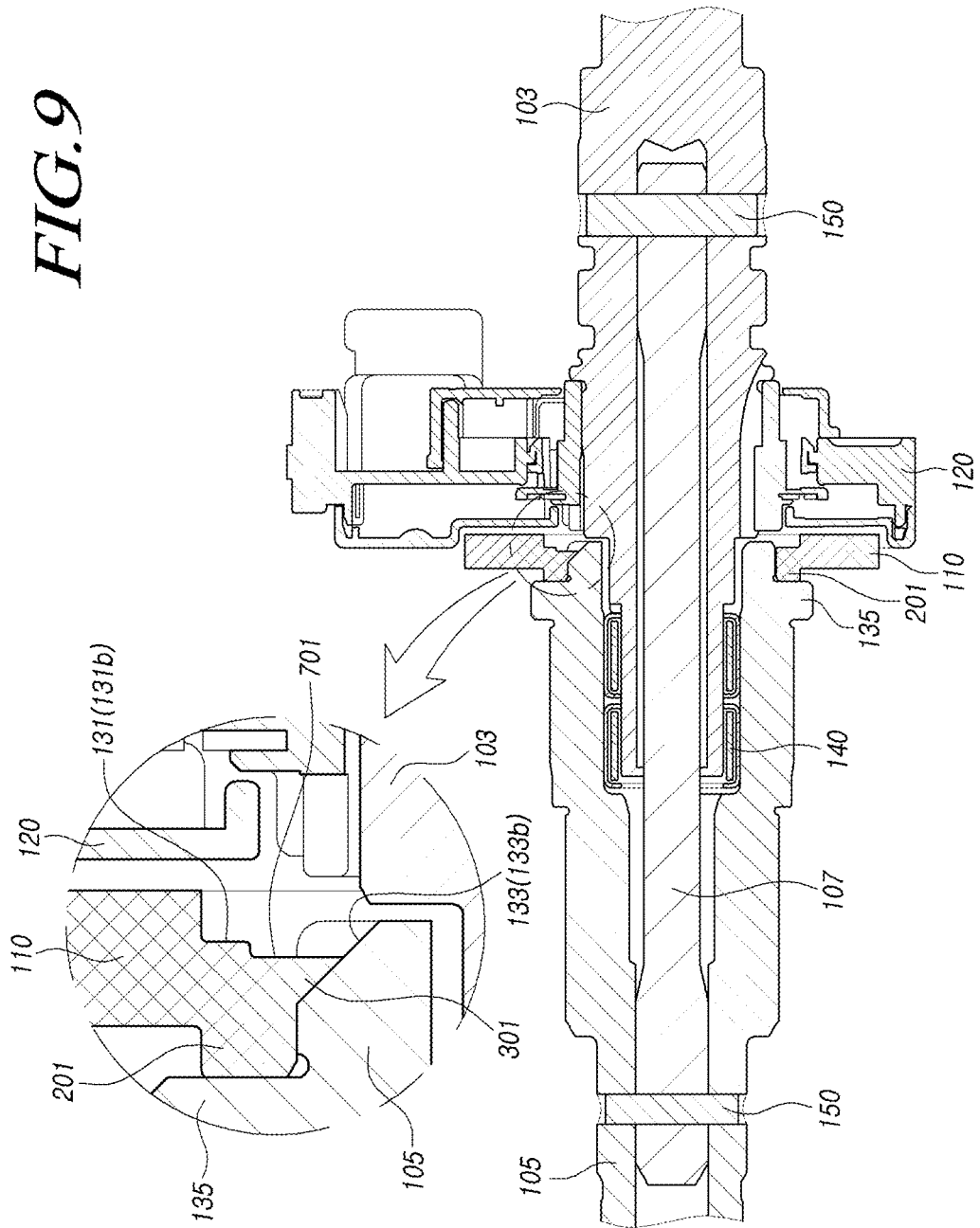

In addition, referring to FIGS. 6 to 8, the recess 133 may extend to one distal end of the second shaft 105. In other words, the recess 133 is formed to be open in one axial direction.

Since the recess 133 is open in one axial direction, the protrusion 301 fitted into the recess 133 may be provided by axially calking the stepped portion 131 after the sensor rotor 110 is press-fitted into the second shaft 105.

A slope 133a may be formed on the recess 133, and the stepped portion 131 may be calked, allowing the protrusion 301 to be supported on the slope 133a. Alternatively, a stepped portion 133b may be formed on the recess 133, allowing the protrusion 301, to be seated on the stepped portion 133b.

That is, the protrusion 301 is configured to be radially and axially supported within the recess 133, such that the sensor rotor 110 may be fixed on the outer circumferential surface of the second shaft 105.

As illustrated in the drawings, when the protrusion 301 is formed by calking the stepped portion 131, first depressions 701 and 801, which are axially stepped, or second depressions 703 and 803, which are axially depressed, may be formed in the stepped portion 131. As described above, since the first depressions 701 and 801 or the second depressions 703 and 803 are provided on the stepped portion 131 stepped with respect to the plane defined by the blades 113, the calking may not lower the flatness of the blades 113 or the accuracy of the torque sensor 120.

In addition, as described above, the first shaft 103 connected to the steering wheel 101 is an input shaft receiving steering torque of the driver. The second shaft 105 may be an output shaft coupled to a worn wheel 1003 engaged with a worm shaft 1101, or may be a pinion shaft 1203 engaged with a rack bar 1201.

First, as illustrated in FIGS. 10 and 11, the worm wheel 1003 engaged with the worm shaft 1101 may be coupled to the second shaft 105.

The worm shaft 1101 is connected to the motor to rotate the worm wheel 1003. The motor is connected to an electronic control device to provide assistance torque assisting in the steering torque generated by the driver. The electronic control device receives information collected by the torque sensor 120 or the like and generates a control signal.

The first shaft 103 and the second shaft 105 are supported to a housing 1001 via a first bearing 1103 and a second bearing 1105.

Alternatively, as illustrated in FIGS. 12 to 14, the second shaft 105 may be the pinion shaft 1203 engaged with the rack bar 1201.

That is, the pinion gear 1213 is provided on the outer circumferential surface of the second shaft 105 to be engaged with a rack gear 1211 provided on the rack bar 1201.

Although not shown in the drawings, the rack bar 1201 may be provided with a screw on the outer circumferential surface thereof, such that a ball nut is engaged with the screw. A motor rotating the ball nut may generate axial assistance power to the rack bar 1201, thereby assisting in the steering torque generated by the driver.

The first shaft 103 rotates together with the steering wheel 101 as an integral body, and the torque sensor 120 detects a phase difference with respect to the pinion shaft 1203 and transmits an electrical signal to the electronic control device controlling the motor.

According to the vehicle steering apparatus having the above-described configuration, the stepped portion provided on the body of the sensor rotor is fitted into the recess provided in the outer circumferential surface of the second shaft by the calking, such that the sensor rotor is fixed on the outer circumferential surface of the second shaft in the circumferential direction. In addition, the stepped portion stepped with respect to the plane defined by the blades facing the torque sensor is calked, such that the flatness of the blades is not lowered by the calking. Accordingly, the accuracy of the torque sensor is not lowered.

In addition, since the sensor rotor is formed of a metal, such as steel, the durability of the sensor rotor to heat and abrasion can be improved. It is possible to prevent the sensor rotor from being deformed or the accuracy of the torque sensor from being lowered by heat or friction generated during the rotation of the first shaft and the second shaft.

In addition, since the body of the sensor rotor supported on the second shaft and the blades of the sensor rotor facing the torque sensor are integrally fabricated, the assembly process can be removed, thereby facilitating a fabricating process and reducing fabrication costs.

In addition, the protrusion provided on the sensor rotor increases the area of the sensor rotor supported on the outer circumferential surface of the second shaft, thereby improving the reliability of fitting. Accordingly, even in the case in which the stepped portion is provided on the body, the sensor rotor can be prevented from being deformed by pressure while being press-fitted around the second shaft.

In addition, since the annular stepped portion and the annular protrusion are provided on one side surface and the other side surface of the body, the stepped portion and the protrusion can be simultaneously formed by axially pressing the inner diameter portion of the body, thereby reducing the fabrication process and reducing fabrication costs.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle steering apparatus comprising:
a first shaft to which one which one end of a torsion bar and a torque sensor are coupled;
a second shaft to which the other end of the torsion bar is coupled, the second shaft having a recess in an outer circumferential surface of one end portion thereof; and
a sensor rotor comprising an annular body coupled to the outer circumferential surface of the one end portion of the second shaft and having a stepped portion being provided on an inner circumferential surface of the annular body to be open in one axial direction, and blades protruding from outer circumferential portions of the annular body to face the torque sensor, wherein the annular body of the sensor rotor has one or more protrusions protruding from the stepped portion provided on the inner circumferential surface of the annular body.

2. The vehicle steering apparatus according to claim 1, wherein the sensor rotor is press-fitted into and coupled to the second shaft.

3. The vehicle steering apparatus according to claim 1, wherein the second shaft comprises a support protruding from an outer circumferential surface of the second shaft and supported on a side surface of the annular body facing in the other axial direction.

4. The vehicle steering apparatus according to claim 3, wherein one of the protrusions protrudes from a side surface of the stepped portion of the annular body facing in the other axial direction to be supported on the outer circumferential surface of the second shaft.

5. The vehicle steering apparatus according to claim 4, wherein the one of the protrusions comprises an annular protrusion extending in a circumferential direction.

6. The vehicle steering apparatus according to claim 1, wherein the stepped portion is provided in a position corresponding to the recess.

7. The vehicle steering apparatus according to claim 1, wherein the stepped portion comprises a portion of the inner circumferential surface of the annular body and another portion of the inner circumferential surface of the annular body, an inner diameter of which is greater than that the portion of the inner circumferential surface of the annular body.

8. The vehicle steering apparatus according to claim 1, wherein one of the protrusions protrudes from an inner circumferential surface of the stepped portion of the annular body to be fitted into the recess.

9. The vehicle steering apparatus according to claim 8, wherein the one of the protrusions is provided by calking the stepped portion.

10. The vehicle steering apparatus according to claim 9, wherein the recess extends to one distal end of the second shaft.

11. The vehicle steering apparatus according to claim 10, wherein the recess has a slope on which the one of the protrusions is supported.

12. The vehicle steering apparatus according to claim 10, wherein the recess has a stepped portion on which the one of the protrusions is seated.

* * * * *